(12) United States Patent
McLaughlin et al.

(10) Patent No.: US 10,637,841 B2
(45) Date of Patent: Apr. 28, 2020

(54) APPARATUS AND METHOD FOR USING A SECURITY APPLIANCE WITH IEC 61131-3

(71) Applicant: Honeywell International Inc., Morris Plains, NJ (US)

(72) Inventors: Paul F. McLaughlin, Ambler, PA (US); Joseph Felix, Jenkintown, PA (US); David Barry Granatelli, Lilyfield (AU)

(73) Assignee: Honeywell International Inc., Morris Plains, NJ (US)

( * ) Notice: Subject to any disclaimer, the term of this patent is extended or adjusted under 35 U.S.C. 154(b) by 272 days.

(21) Appl. No.: 14/962,904

(22) Filed: Dec. 8, 2015

(65) Prior Publication Data

US 2017/0163619 A1 Jun. 8, 2017

(51) Int. Cl.
*G06F 7/04* (2006.01)
*G06F 15/16* (2006.01)
*H04L 29/06* (2006.01)

(52) U.S. Cl.
CPC ................... *H04L 63/08* (2013.01)

(58) Field of Classification Search
CPC ......... H04L 63/08; H04L 63/16; H04L 63/00; H04L 63/02; H04L 63/0236
See application file for complete search history.

(56) References Cited

U.S. PATENT DOCUMENTS

| | | | |
|---|---|---|---|
| 6,976,105 B1 * | 12/2005 | Wright | G06F 13/387 710/104 |
| 7,451,351 B2 | 11/2008 | Gunnmarker et al. | |
| 8,594,822 B2 | 11/2013 | McGuinn et al. | |
| 8,667,589 B1 | 3/2014 | Saprygin et al. | |
| 2001/0020241 A1 * | 9/2001 | Kawamoto | H04L 12/2803 |
| 2002/0046349 A1 * | 4/2002 | Saito | H04L 12/2805 726/14 |

(Continued)

FOREIGN PATENT DOCUMENTS

EP 1414216 A2 4/2004

OTHER PUBLICATIONS

Notification of Transmittal of the International Search Report and the Written Opinion of the International Searching Authority issued for PCT/US2016/061771 dated Feb. 13, 2017, 10 pages.

(Continued)

*Primary Examiner* — Trong H Nguyen
*Assistant Examiner* — Amie C. Lin

(57) ABSTRACT

A security appliance to perform a method that includes receiving a first set of data from a first device using a first secure protocol of a first network, the first secure protocol comprises a first level of security, and determining, by the security appliance, that the received first set of data is intended for a second device on a second network using a second secure protocol, the second secure protocol comprises a second level of security different from the first. The method includes authenticating, by the security appliance, the received first set of data from the first network using the first secure protocol for transmission through the second network using the second secure protocol while collecting and concentrating additional data from the first network and transmitting, by the security appliance, the received first set of data to the second device via the second network comprising the second secure protocol.

22 Claims, 4 Drawing Sheets

(56) References Cited

U.S. PATENT DOCUMENTS

| | | | |
|---|---|---|---|
| 2007/0263658 A1* | 11/2007 | Ung | H04L 63/105 |
| | | | 370/466 |
| 2009/0028184 A1* | 1/2009 | Carpman | G05B 19/058 |
| | | | 370/466 |
| 2009/0187969 A1 | 7/2009 | DeFord et al. | |
| 2010/0192216 A1 | 7/2010 | Komatsu | |
| 2010/0251330 A1 | 9/2010 | Kroeselberg et al. | |
| 2013/0159490 A1 | 6/2013 | Huh et al. | |
| 2014/0380001 A1 | 12/2014 | Schubert et al. | |

OTHER PUBLICATIONS

Paul F. McLauglin, et al., "Apparatus and Method for Using an Internet of Things Edge Secure Gateway", U.S. Appl. No. 14/963,013, 28 pages.

Paul F. McLaughlin, et al., "Apparatus and Method for Using a Distributed Systems Architecture (DSA) in an Internet of Things (IOT) Edge Appliance", U.S. Appl. No. 14/962,722, 26 pages.

* cited by examiner

APPARATUS AND METHOD FOR USING A SECURITY APPLIANCE WITH IEC 61131-3

TECHNICAL FIELD

This disclosure is generally directed to a security appliance. More specifically, this disclosure is directed to a security appliance with IEC 61131-3 for use in an industrial process control and automation system.

BACKGROUND

The ability to integrate subsystem devices that communicate using a variety of legacy protocols into a modern secure Ethernet network requires the use of different devices (such as protocol converters, gateways, firewalls, and dedicated security appliances). Each such device typically serves a single function or supports a single protocol, is typically sourced from different vendors and uses different configuration tools that are at a high risk of exposure to a security attack, and does not have a programming environment that would allow an end user to customize the behavior of the device.

SUMMARY

This disclosure relates to an apparatus and method for using a security appliance in a process control system.

In a first embodiment, a method is provided. The method includes receiving, by a security appliance, a first set of data from a first device using a first secure protocol of a first network, wherein the first secure protocol comprises a first level of security. The method also includes determining, by the security appliance, that the received first set of data is intended for a second device on a second network using a second secure protocol, wherein the second secure protocol comprises a second level of security that is different from the first level of security. The method further includes authenticating, by the security appliance, the received first set of data from the first network using the first secure protocol for transmission through the second network using the second secure protocol while collecting and concentrating additional data from the first network. In addition, the method includes transmitting, by the security appliance, the received first set of data to the second device via the second network comprising the second secure protocol.

In a second embodiment, a security appliance including processing circuitry is provided. The processing circuitry is configured to receive a first set of data from a first device using a first secure protocol of a first network, wherein the first secure protocol comprises a first level of security. The processing circuitry is also configured to determine that the received first set of data is intended for a second device on a second network using a second secure protocol, wherein the second secure protocol comprises a second level of security that is different from the first level of security. The processing circuitry is further configured to authenticate the received first set of data from the first network using the first secure protocol for transmission through the second network using the second secure protocol while collecting and concentrating additional data from the first network. In addition, the processing circuitry is configured to transmit the received first set of data to the second device via the second network comprising the second secure protocol.

In a third embodiment, a non-transitory, computer-readable medium storing one or more executable instructions is provided. The one or more executable instructions, when executed by one or more processors, cause the one or more processors to receive a first set of data from a first device using a first secure protocol of a first network, wherein the first secure protocol comprises a first level of security. The one or more executable instructions, when executed by the one or more processors, also cause the one or more processors to determine that the received first set of data is intended for a second device on a second network using a second secure protocol, wherein the second secure protocol comprises a second level of security that is different from the first level of security. The one or more executable instructions, when executed by the one or more processors, further cause the one or more processors to authenticate the received first set of data from the first network using the first secure protocol for transmission through the second network using the second secure protocol while collecting and concentrating additional data from first network. In addition, the one or more executable instructions, when executed by the one or more processors, cause the one or more processors to transmit the received first set of data to the second device via the second network comprising the second secure protocol.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures discussed below and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

The ability to integrate subsystem devices that communicate using a variety of legacy protocols into a modern secure Ethernet network requires the use of different devices (such as protocol converters, gateways, firewalls, and dedicated security appliances). Each such device typically serves a single function or supports a single protocol. Thus, a number of such devices have to be connected in series. These devices are typically sourced from different vendors and use different configuration tools, thereby increasing engineering complexity for the end user. In addition, legacy protocols are not designed with cybersecurity in mind, and the security exposure of the integrated system is high. The security appliances that exist in the market today also do not have programming environments that would allow the end user to customize the behavior of the appliance. This makes protocol conversion and other manipulation of data during transmission difficult on the same appliance.

Figure 1:
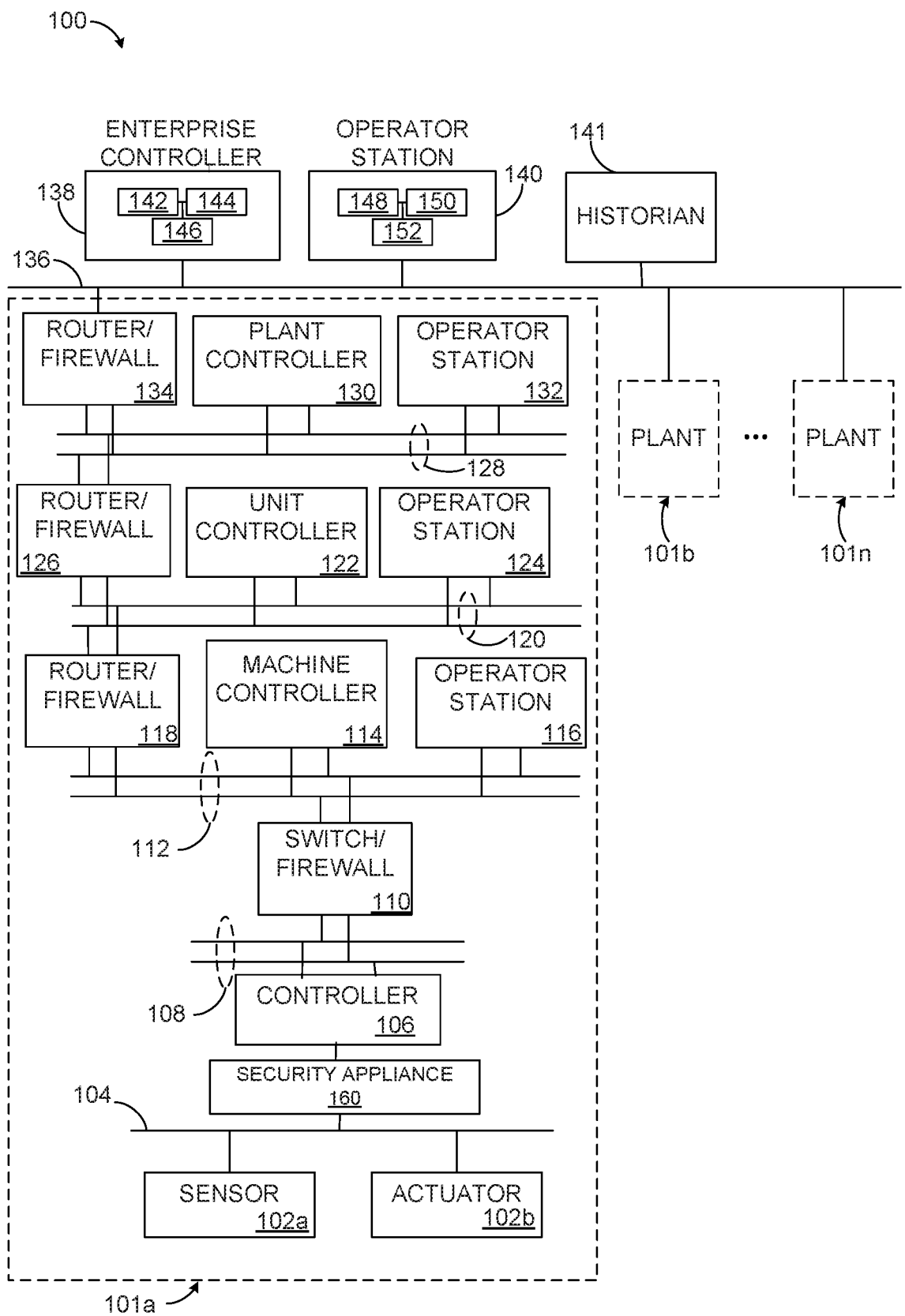
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

In accordance with this disclosure, the system 100 also includes a security appliance 160. The security appliance 160 integrates the network 104 (such as a potentially insecure legacy Ethernet or serial network) with a controller (such as controller 106) on a modern secure network 108. For example, the security appliance 160 can include multiple Ethernet ports, and one or two Ethernet ports can be connected to the network 108 (the secure network) while other Ethernet ports (such as two Ethernet ports, two RS-232 ports, or two RS485 ports) can be connected to the network 104 (the legacy network) or directly to third party devices (such the controller 106, the actuator 102b, the sensor 102a, or the like).

In other words, the security appliance 160 isolates the network 108 and the from the network 104. The security appliance 160 is configured, when deployed in read-only mode, to block all attempts by devices connected to the network 108 to write to devices (such as third party devices) connected to the network 104. The security appliance 160 is also configured to provide security to devices connected to the networks while allowing validated protocol messages to be pass through the networks. The security appliance 160 can be configured by an end user to perform protocol conversion and other data manipulation using an embedded IEC 6111 environment. Features of the security appliance 160 are discussed further herein.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device (s) 142. Each of the controllers 106, 114, 122, 130, 138 could also include at least one network interface 146, such as one or more Ethernet interfaces or wireless transceivers. Also, each of the operator stations 116, 124, 132, and 140 could include one or more processing devices 148 and one or more memories 150 for storing instructions and data used, generated, or collected by the processing device(s) 148. Each of the operator stations 116, 124, 132, and 140 could also include at least one network interface 152, such as one or more Ethernet interfaces or wireless transceivers.

Although FIG. 1 illustrates one example of an industrial process control and automation system 100, various changes may be made to FIG. 1. For example, a control and automation system could include any number of sensors, actuators, controllers, servers, operator stations, networks, risk managers, and other components. Also, the makeup and arrangement of the system 100 in FIG. 1 is for illustration only. Components could be added, omitted, combined, or placed in any other suitable configuration according to particular needs. For example, while the industrial process control and automation system 100 can be based on the Purdue model, the security appliance 160 can be implemented to link between a secure and less secure network. Further, particular functions have been described as being performed by particular components of the system 100. This is for illustration only. In general, control and automation systems are highly configurable and can be configured in any suitable manner according to particular needs.

Figure 2:
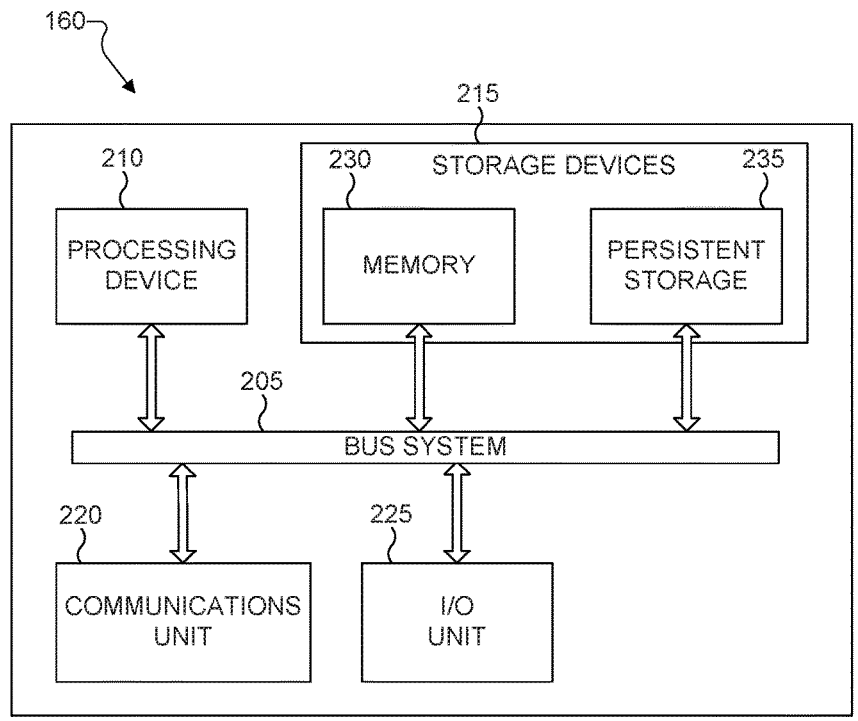
FIGS. 2 and 3 illustrate example details of a security appliance according to this disclosure.

FIG. 2 illustrates an example configuration of the security appliance 160 according to this disclosure. As shown in FIG. 2, the security appliance 160 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 136. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Although FIG. 2 illustrates one example configuration of a security appliance 160, various changes may be made to FIG. 2. For example, the security appliance 160 can come in a wide variety of configurations. The security appliance 160 shown in FIG. 2 is meant to illustrate one example type of security appliance and does not limit this disclosure to a particular type of security appliance.

Figure 3:
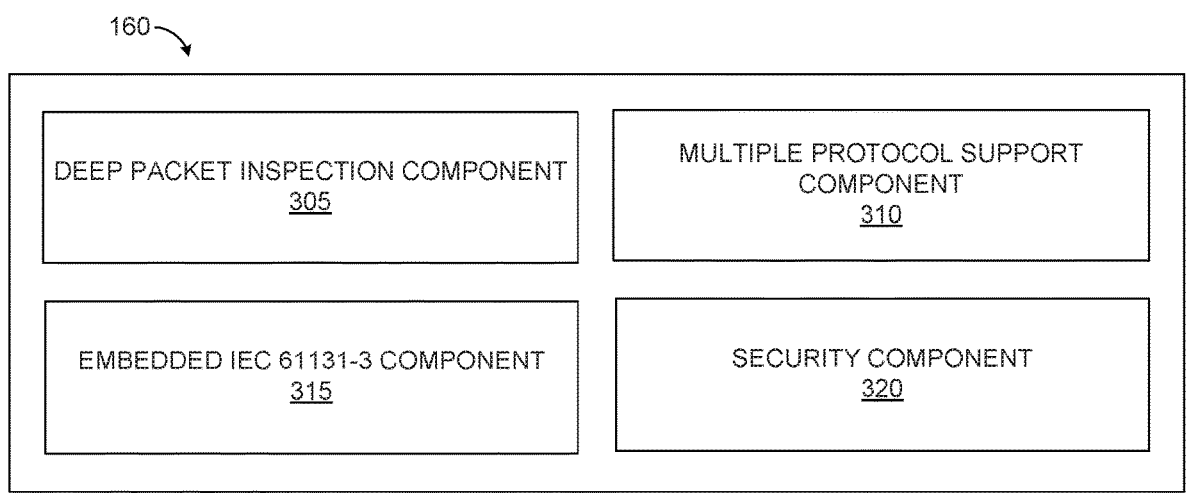

FIG. 3 illustrates multiple components of a security appliance 160 according to this disclosure. As shown in FIG. 3, the security appliance 160 includes an IEC 61131 environment. The security appliance 160 includes a deep packet inspection component 305. The deep packet inspection component 305 allows the security appliance 160 to provide a deep packet inspection firewall that supports both read-only and write only options. The deep packet inspection component 305 allows the security appliance 160 to provide deep packet inspection for all supported protocols of messages passing through the security appliance 160.

The security appliance 160 also supports multiple protocols through a multiple protocol support component 310. The multiple protocol support component 310 allows the security appliance 160, for example, to support any open standards based industrial protocol. The security appliance 160 also includes an embedded IEC 61131-3 component 315. The embedded IEC 61131-3 component 315 provides the security appliance 160 with an environment that allows the security appliance 160 to manipulate data that passes through the security appliance 160. The embedded IEC 61131-3 component 315 also allows the security appliance 160 to concentrate data as well as convert data protocols as data passes through the security appliance 160. In other words, the embedded IEC 61131-3 component 315 allows the security appliance 160 to act as both a data concentrator and a pass-through protocol converter. A data concentrator can, for example, group data from two or more devices and transmit that data in a single table or a plurality data packet slots to a requesting controller or operator station so that the controller or operator station is unable to identify that the data is coming from the two or more devices. In other words, the controller or operator station can only identify that the data is coming from the data concentrator and not the particular two or more devices. The embedded IEC 61131-3 component 315 also allows the security appliance 160 to combine the features of a programmable logic controller, a protocol gateway, and a security appliance. The security appliance 160 also includes a security component 320. The security component 320 allows the security appliance to provide modern cybersecurity features including IPsec with X.509 certificate M2M endpoint authentication and cryptographically secure storage for digital certificates and digital keys.

Although FIG. 3 illustrates one example of a security appliance 160, various changes may be made to FIG. 3. The security appliance 160 shown in FIG. 3 is meant to illustrate one example type of security appliance and does not limit this disclosure to a particular type of security appliance.

Figure 4:
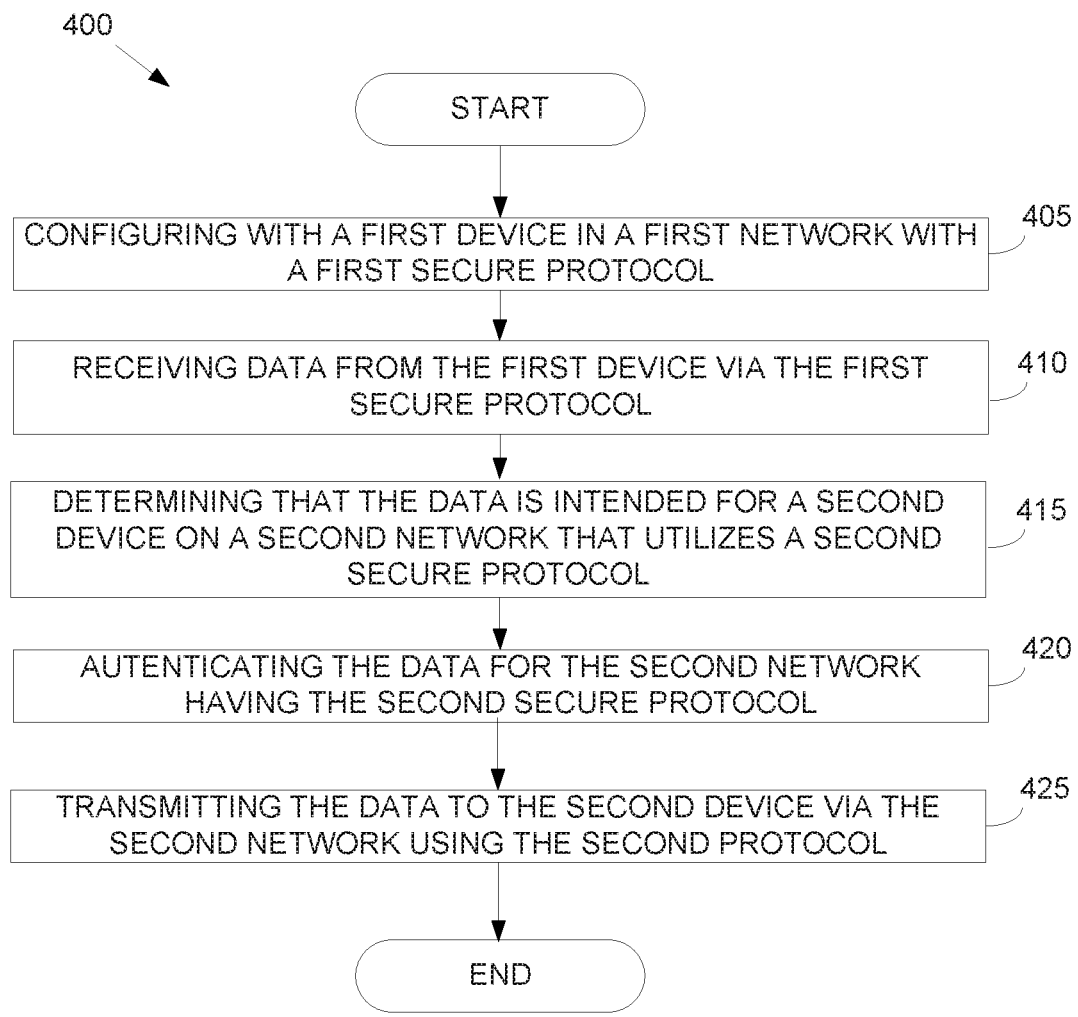
FIGS. 4 and 5 illustrate example methods according to this disclosure.

FIG. 4 illustrates an example method 400 according to this disclosure. The method 400 can be implemented using any suitable devices and in any suitable systems. For example, as discussed below, the method 400 is implemented with a security appliance 160 discussed herein. For ease of explanation, the method 400 is described with respect to the system 100 of FIG. 1.

As shown in FIG. 4, at step 405, a security appliance 160 configures with a first device in a first network. The first device utilizes a first communication protocol with a first level of security. At step 410, the security appliance 160 receives data from the first device through the first communication protocol over the first network. The security appliance 160 is configured to concentrate data as well as communicate data communicating between a network utilizing a less secure protocol and network utilizing a more secure protocol using an embedded IEC 61131-3 component 315. At step 415, the security appliance 160 analyzes the received data and determines a second device on a second network using a second communication protocol having a second level of security that is higher than the first level of security that is intended to receive the data. The second device can receive data on a second network utilizing a second protocol that is more secure than the first protocol. In an embodiment, the first communication protocol and the second communication protocol are not compatible protocols. At step 420, the security appliance 160, using the embedded IEC 61131-3 component 315, authenticates the received data so that the received data can be communicated through the second network using the second secure protocol. At step 425, the security appliance 160 transmits the data using the second communication protocol to the second device.

Although FIG. 4 illustrates one example of the method 400, various changes may be made to FIG. 4. For example, while shown as a series of steps, various steps shown in FIG. 4 could overlap, occur in parallel, occur in a different order, or occur multiple times. Moreover, some steps could be combined or removed and additional steps could be added according to particular needs.

Figure 5:
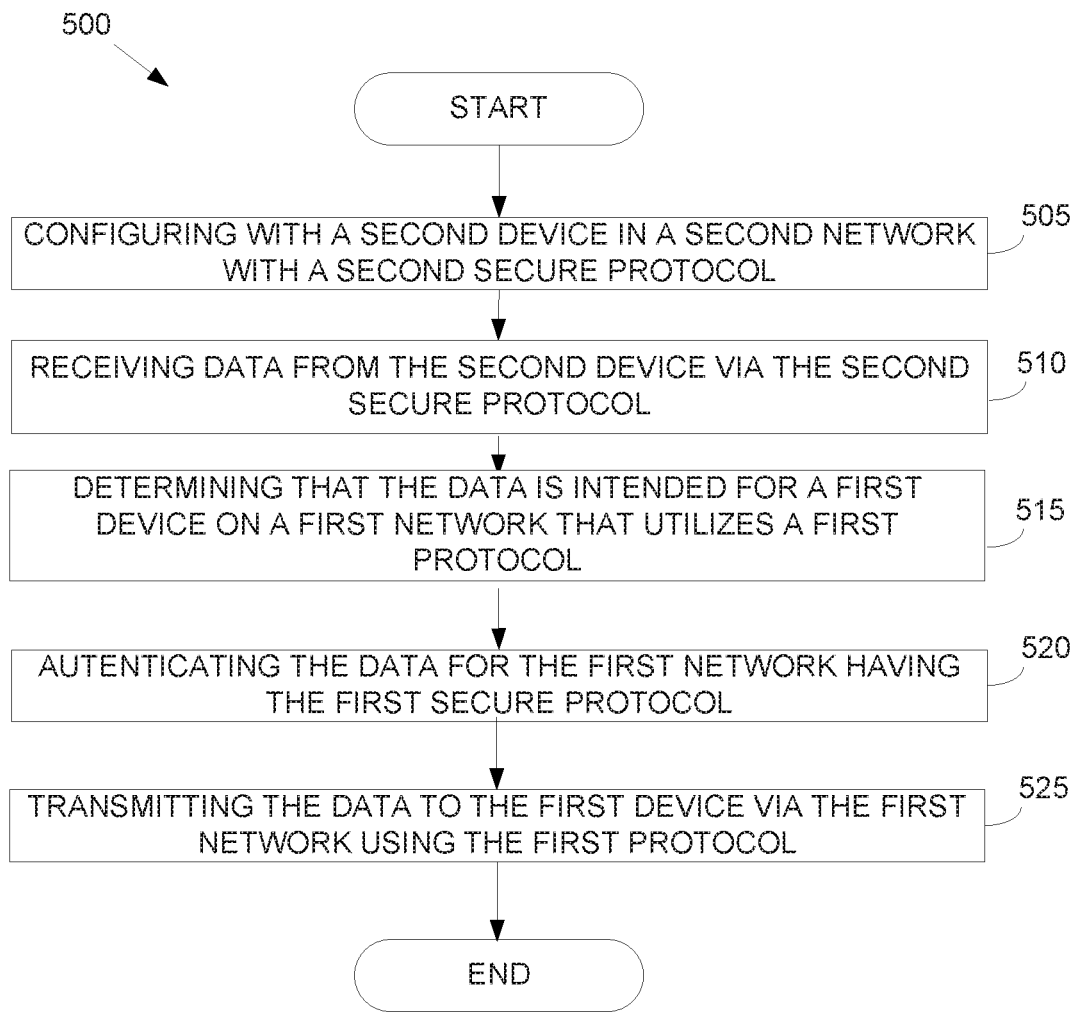

FIG. 5 illustrates an example method 500 according to this disclosure. The method 500 can be implemented using any suitable devices and in any suitable systems. For example, as discussed below, the method 500 is implemented with a security appliance 160 discussed herein. For ease of explanation, the method 500 is described with respect to the system 100 of FIG. 1.

As shown in FIG. 5, at step 505, a security appliance 160 configures with a second device within a second network using a second secure protocol. At step 510, the security appliance 160 receives data from the second device via the second network using the second secure protocol. In an embodiment, the security appliance 160 can receive data from the second device in response to transmitting data to the second device (for example, in response to transmitting data as described at step 425 of FIG. 4). The security appliance 160 is configured to concentrate data as data is received the security appliance 160 using an embedded IEC 61131-3 component 315. At step 515, the security appliance 160 analyzes the received data and determines a first device that is intended to receive the data. The first device utilizes a first communication protocol different from the second communication protocol. In an embodiment, the second communication protocol and the first communication protocol are not compatible protocols. At step 520, the security appliance 160, using the embedded IEC 61131-3 component 315, authenticates the received data so that the received data can be communicated through the first network using the first secure protocol. At step 525, the security appliance 160 transmits the data using the first communication protocol to the first device.

Although FIG. 5 illustrates one example of the method 500, various changes may be made to FIG. 5. For example, while shown as a series of steps, various steps shown in FIG. 5 could overlap, occur in parallel, occur in a different order, or occur multiple times. Moreover, some steps could be combined or removed and additional steps could be added according to particular needs.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving, at an integrated security appliance, using a communication link of the integrated security appliance, a first set of data from a first device that is operably coupled to a first network using a first secure protocol of the first network, wherein the first secure protocol comprises a first level of security;
   determining from the received first set of data, by the integrated security appliance using a processor of the integrated security appliance, that the received first set of data is intended for a second device on a second network using a second secure protocol, wherein the second secure protocol comprises a second level of security that is different from the first level of security;
   authenticating, by the integrated security appliance using the processor of the integrated security appliance, the received first set of data using the first secure protocol for transmission through the second network using the second secure protocol; and
   transmitting, from the integrated security appliance, using the communication link of the integrated security appliance, the received first set of data to the second device via the second network using the second secure protocol.

2. The method of claim 1, wherein the first level of security comprises a lower level of security than the second level of security.

3. The method of claim 1, wherein the integrated security appliance is configured to operate in at least one of a read-only mode and a write-only mode.

4. The method of claim 3, wherein the first set of data from the first device comprises read-only data.

5. The method of claim 3, wherein, when the integrated security appliance operates in the read-only mode, the integrated security appliance blocks all attempts by the first device to write to the second device.

6. The method of claim 1, further comprising:
   receiving, using the communication link of the integrated security appliance, a second set of data from the second device via the second network in response to transmitting the first set of data to the second device.

7. The method of claim 1, further comprising:
   discovering, using the communication link of the integrated security appliance, the first device via the first network before receiving the first set of data from the first device.

8. The method of claim 1, wherein collecting and concentrating the additional data from the first network comprises grouping data from two or more devices of the first network so that the grouped data appears to come from the integrated security appliance.

9. The method of claim 1, wherein transmitting the received first set of data to the second device via the second network includes transmitting the received first set of data using the second secure protocol.

10. An integrated security appliance comprising:
    processing circuitry configured to:
       receive, at the integrated security appliance, a first set of data from a first device that is operably coupled to a first network using a first secure protocol of the first network, wherein the first secure protocol comprises a first level of security;
       determine from the received first set of data, by the integrated security appliance, that the received first set of data is intended for a second device on a second network using a second secure protocol, wherein the second secure protocol comprises a second level of security that is different from the first level of security;
       authenticate, at the integrated security appliance, the received first set of data using the first secure protocol for transmission through the second network using the second secure protocol while collecting and concentrating additional data from the first network; and
       transmit, from the integrated security appliance, the received first set of data to the second device via the second network using the second secure protocol.

11. The integrated security appliance of claim 10, wherein the first level of security comprises a lower level of security than the second level of security.

12. The integrated security appliance of claim 10, wherein the integrated security appliance is configured to operate in at least one of a read-only mode and a write-only mode.

13. The integrated security appliance of claim 12, wherein the first set of data from the first device comprises read-only data.

14. The integrated security appliance of claim 12, wherein, when the integrated security appliance operates in the read-only mode, the integrated security appliance is configured to block all attempts by the first device to write to the second device.

15. The integrated security appliance of claim 10, wherein the processing circuitry is further configured to:
    receive a second set of data from the second device via the second network in response to transmitting the first set of data to the second device.

16. The integrated security appliance of claim 10, wherein the processing circuitry is further configured to:
    discover the first device via the first network before receiving the first set of data from the first device.

17. A non-transitory, computer-readable medium storing executable instructions that, when executed by one or more processors, cause the one or more processors to:
    receive, at an integrated security appliance, a first set of data from a first device that is operably coupled to a first network using a first secure protocol of the first network, wherein the first secure protocol comprises a first level of security;
    determine from the received first set of data, at the integrated security appliance, that the received first set of data is intended for a second device on a second network using a second secure protocol, wherein the second secure protocol comprises a second level of security that is different from the first level of security;
    authenticate, at the integrated security appliance, the received first set of data using the first secure protocol for transmission through the second network using the second secure protocol while collecting and concentrating additional data from the first network; and
    transmit, from the integrated security appliance, the received first set of data to the second device via the second network using the second secure protocol.

18. The non-transitory, computer-readable medium of claim 17, wherein the first level of security comprises a lower level of security than the second level of security.

19. The non-transitory, computer-readable medium of claim 17, wherein the executable instructions, when executed by the one or more processors, further cause the integrated security appliance to operate in at least one of a read-only mode and a write-only mode.

20. The non-transitory, computer-readable medium of claim 19, wherein the executable instructions, when executed by the one or more processors, further cause the one or more processors to:
    block all attempts by the first device to write to the second device when the integrated security appliance operates in the read-only mode.

21. The non-transitory, computer-readable medium of claim 17, wherein the executable instructions, when executed by the one or more processors, further cause the one or more processors to:
    receive, at the integrated security appliance, a second set of data from the second device via the second network in response to transmitting the first set of data to the second device.

22. The non-transitory, computer-readable medium of claim 17, wherein the executable instructions, when executed by the one or more processors, further cause the one or more processors to:
    discover, at the integrated security appliance, the first device via the first network before receiving the first set of data from the first device.

\* \* \* \* \*